United States Patent [19]

Lepore et al.

[11] Patent Number: 5,245,677
[45] Date of Patent: Sep. 14, 1993

[54] DIRECTIONAL RUNNING AVERAGE SEGMENTATION

[75] Inventors: Robert G. Lepore, Simi Valley; Dennis C. Braunreiter, Canyon Country, both of Calif.

[73] Assignee: Hughes Aircraft Company, Los Angeles, Calif.

[21] Appl. No.: 741,918

[22] Filed: Aug. 8, 1991

[51] Int. Cl.[5] ............................................. G06K 9/20
[52] U.S. Cl. .................................. 382/48; 382/52
[58] Field of Search .................. 382/18, 48, 51–53; 358/463, 465, 466

[56] References Cited

U.S. PATENT DOCUMENTS

| | | | |
|---|---|---|---|
| 4,597,009 | 6/1986 | Ballmer et al. | 382/52 |
| 4,850,029 | 7/1989 | Moyer et al. | 382/52 |
| 4,903,316 | 2/1990 | Hongo et al. | 382/52 |
| 5,086,484 | 2/1992 | Katayama et al. | 382/52 |

Primary Examiner—Jose L. Couso
Attorney, Agent, or Firm—Charles D. Brown; Randall M. Heald; W. K. Denson-Low

[57] ABSTRACT

In a video based image recognition system, an adaptive threshold level for each pixel is set based upon a running horizontal and/or running vertical average of the pixel intensities combined with suppression of the running average threshold computation to hold the threshold value constant upon the detection of pixels with an intensity above the threshold, and continuing until the detection of a pixel having an intensity lower than the held constant value. After the edge of an image has been detected, and thereafter upon detecting the first pixel having an intensity less than the held threshold, a formula uses a particular combination of pixel location values to compute an intermediate running average value, after which the normal running average is computed. One possible configuration of a system embodying the segmentation process includes within a block diagram a noise calculation block (41), a multiplication block (43), a running average calculation block (45), a summing junction (47), pixel delay block (49), a pair of comparators (51) and (53).

15 Claims, 3 Drawing Sheets

DIRECTIONAL RUNNING AVERAGE SEGMENTATION

BACKGROUND OF THE INVENTION

Field of the Invention

This invention relates to image processing techniques and, more particularly, to a method and apparatus for thresholding analog video signals to detect targets and suppress clutter and noise.

Discussion

One of the problems in performing efficient digital processing of an image is to properly digitize the analog video signal from the detector or source. Traditionally, the amplitude or intensity of the analog video signal from the detector is compared against a fixed threshold. Analog levels above the threshold are converted to a binary or digital one whereas analog signal levels below the fixed threshold are converted to a digital zero level.

The thresholding technique should allow detection of the target signal in the presence of clutter and noise. The noise is a high frequency noise which may be generated by the detector itself. As shown in FIG. 1, a fixed thresholding technique creates false detections that are due to noise instead of actual scene content. The clutter contains natural as well as man made objects which may or may not be distinguishable from the target.

If the threshold is too low, excessive digitization of clutter and noise will occur. If the threshold is weighted too high, a loss of the digitized target information may result. Thresholds based upon adjacent pixel gradients are sensitive to objects whose intensity changes sharply across the image area. A method is needed to more accurately characterize the target from the clutter and noise as the image is being scanned.

SUMMARY OF THE INVENTION

In accordance with the teachings of the present invention, an adaptive threshold level for each pixel is set based upon a running horizontal and/or running vertical average of the pixel intensities combined with suppression of the running average computation, holding the threshold value constant, initiated upon the detection of pixels with an intensity above the threshold, and continuing until the detection of a pixel having an intensity lower than the held constant value. Upon detecting the first pixel having an intensity less than the held threshold, a formula uses a particular combination of pixel location values to compute an intermediate running average value, after which the normal running average is computed.

BRIEF DESCRIPTION OF THE DRAWINGS

The various advantages of the present invention will become apparent to those skilled in the art after reading the following specification and by reference to the drawings in which.

DESCRIPTION OF THE PREFERRED EMBODIMENT

In accordance with the teachings of the present invention, an improved method and apparatus is provided for thresholding analog video signals in such a way that real objects or potential targets can be detected although various kinds of noise and clutter exist in the video signal. The analog signals can be derived from a variety of sources, such as an infrared focal plane array.

One technique representing a significant improvement over the prior art is disclosed in U.S. Pat. No. 4,908,875, entitled "Adaptive Thresholding Technique", and assigned to the assignee of the instant application disclosed the computation of a running average to which an offset value is added. The offset therein was a function of global noise and locally generated noise, and assumed a space, or bland, background. The noise in the '875 patent was calculated based upon the sum of the absolute differences between a pixel value and a running average local intensity level.

For a scene with clutter, the noise statistics are more effectively utilizable than the clutter statistics. The present invention herein calculates the median value of adjacent pixel differences under the assumption that the adjacent pixels differences are dominated by noise. The median value eliminates pixel differences which do not obey the assumption.

The present invention improves upon the utilization of a running average, and includes the logical "AND'-'ing of pixel characterization performed horizontally from left to right and right to left, and performed vertically from up to down and down to up.

Figure 1A:
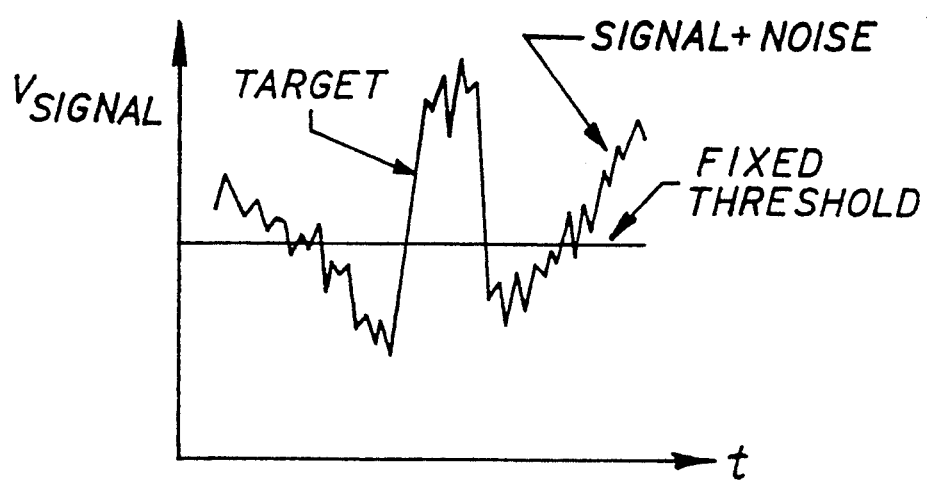
FIG. 1(A-B) are graphs illustrating a fixed thresholding technique of the PRIOR ART.
Figure 1B:
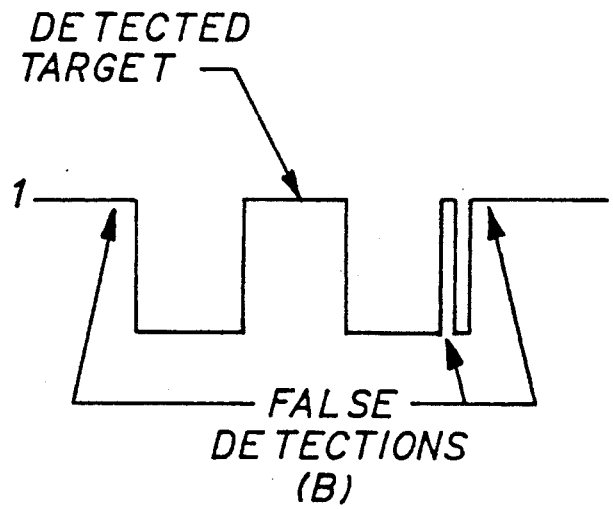

As is known in the art, each frame of video data is divided into a matrix of pixels having a number of rows and columns. By way of a nonlimiting example, a bidirectional scanning focal plane array with two sets of 120 detectors each can be staggered and multiplexed together to generate a 240 pixel×240 pixel array or field of view (FOV). The intensity of the analog signal at each pixel position is ideally a function of a characteristic (e.g., infrared radiation emanating therefrom) of objects within the scanned scene. Unfortunately, the intensity of the analog signal is detrimentally also a function of noise. As indicated in the discussion of FIG. 1, the primary noise is high frequency noise from the detector. Because the magnitude of noise may vary from one detector to the next and also along each scan, an adaptive thresholding approach is provided for each pixel. Pixels with intensity values above their corresponding adaptive threshold limits are digitized or binarized for further processing.

In accordance with the present invention, in a series of rows and columns of pixels, a running average is computed horizontally from right to left and left to right. In theory, the horizontal running average for a given pixel is exactly determined from the values on its left and right. However, the running average is "frozen" when a pixel is encountered whose value is above the threshold, such that the threshold to which a particular pixel is compared may differ when generated on a right to left sweep as compared to a left to right sweep.

Likewise, a running average is also computed vertically from up to down and down to up. The vertical running average for a given pixel is also exactly determined from the values above and below. However, the running average is again "frozen" when a pixel is encountered whose value is above the threshold, such that the threshold to which a particular pixel is compared may differ when generated on an up to down sweep as compared to a down to up sweep.

Once the two vertical and two horizontal sweep calculations are accomplished, the characterization of each pixel, as to whether or not its intensity was above its threshold is performed by logically ANDing the result for each pixel. Thus, a pixel's intensity would have to exceed the running average taken from every direction in order to be classified as having significant intensity above the noise. The multiple directions are required to suppress clutter.

This directional running average segmentation provides segmentation of targets in clutter by comparing the target intensity to the local background and system noise. The segmentation provides improved clutter rejection by processing the image in multiple directions. Additional nonlinear logic allows the segmentation to automatically compensate for various target sizes.

The segmentation device and method is based on establishing a non-recursive or 'running average', of pixel intensities spatially centered about the pixel. This process has been proven to be capable of segmenting a target in clutter, with the segmented target separated from the surrounding clutter. The name identifying this type of segmentation is directional running average segmentation.

The non-recursive average is processed in multiple spatial directions about the pixel. The directional running average about a pixel is added to a measured noise value from the scene multiplied by a constant to establish the individual pixel binarization threshold. The video processed is within a processing window of arbitrary dimensions generally centered about a selected portion of the image, or aimpoint.

To begin the detailed explanation of the system and process of the present invention, the noise present in the signal is first ascertained. The median of the absolute horizontal pixel to adjacent pixel differences was chosen to represent the noise, in that it has been found to be the least sensitive to the influence of object's boundary-background intensity differences within the difference distribution.

The assumption with this measurement is that most of the horizontal adjacent intensities are highly correlated due to sensor characteristics, such as optical blur, smear, and spatial sampling, and differences in the correlated intensities are characteristic of the temporal noise. Large intensity differences resulting from object to background border differences are relatively small in number compared to the object area and background area, and are ignored in the median calculation.

To calculate the absolute pixel to adjacent pixel intensity differences, each pixel intensity was subtracted from the proceeding adjacent pixel. This is represented as follows:

$$x_n = |P(i,j) - P(i+1,j)| \quad (1)$$

$$i = 1 \ldots W - 1$$
$$j = 1 \ldots H$$

where $x_n$ represents an nth value absolute difference, $P(i,j)$ is the pixel intensity positioned in the ith column and the jth row, W is the processing window width, and H is the processing window height.

Since each line contains W-1 adjacent differences, (W-1) * H adjacent differences are processed over the scene. The adjacent differences are then sorted in a histogram according to intensity for the median calculation.

The median is calculated as follows. First the sum of all the differences in the histogram is calculated. This is represented as follows $$m = \sum_{i=0}^{2^{bit}-1} n_i \quad (2)$$

where:

$n_i$ is the number of occurrences of an ith value non-zero absolute difference, m is the sum of all of the differences in the histogram, and, bit is the number of bits in the image intensity.

Once the sum is computed, the median intensity difference is the difference in the histogram which is just below one half of the sum. Since the differences are quantized numbers, the actual median of this histogram of differences must be interpolated. Typically the value of "bit" will be 8, and since an eight bit number can have 256 - 1 affirmative, non-zero levels, the summation will involve the collection of pixels into categories of levels of intensity from zero to 255.

Assuming the actual noise is normal with zero mean and standard deviation $\sigma_n$, where n represents normal, it can be derivably shown that $\sigma_n$ is related to the noise computed at the median of the histogram or median noise, $\sigma_m$, by the relationship:

$$\sigma_n = 1.04 \, \sigma_m \quad (3)$$

Thus the 1.04 multiplicative factor is employed to correct the noise figure generated using the median information collected in equations (1) and (2), and to yield the normal noise figure, $\sigma_n$.

Once the noise figure is generated, the system and method of the present invention proceeds to directional running average segmentation. The following describes the directional running average segmentation process for four spatial directions, namely left-to-right, right-to-left, top-to-bottom, and bottom-to-top. The process can be extended to any combination of spatial directions including diagonal.

Directional running average segmentation consists of the following processes. The running averages are initialized spatially at the edges of the processing window. For left-to-right processing, the average is initialized at the left side of the processing window. For right-to-left processing the average is initialized at the right edge of the window, and so on.

After the filters are initialized, the video is binarized using either the running average threshold established by the intensities spatially centered about that pixel and the scene noise measurement multiplied by a constant, or the clamped threshold which was clamped to the threshold value established for the pixel previously processed.

The threshold is clamped if the leading edge of an object is detected at the end of the running average in the threshold calculation for the previous pixel in the processing direction. Once the trailing edge of an object is detected at the end of the running average in the processing direction, then the threshold calculation for the next pixel is based upon first an intermediate running average and then a normally computed running average, both of which have added a quantity equivalent to the noise multiplied by a constant.

The running average is formed uniquely for each spatial processing direction. The running average or non-recursive average acts as a filter that averages the intensities spatially located about a pixel. As the filter moves across the image, the intensities in the filter are shifted in the opposite direction of the average processing. The last pixel intensity in the filter is removed as the intensities are shifted toward the end position bringing in the new intensity in the beginning filter position with respect to the processing direction.

Figure 2:
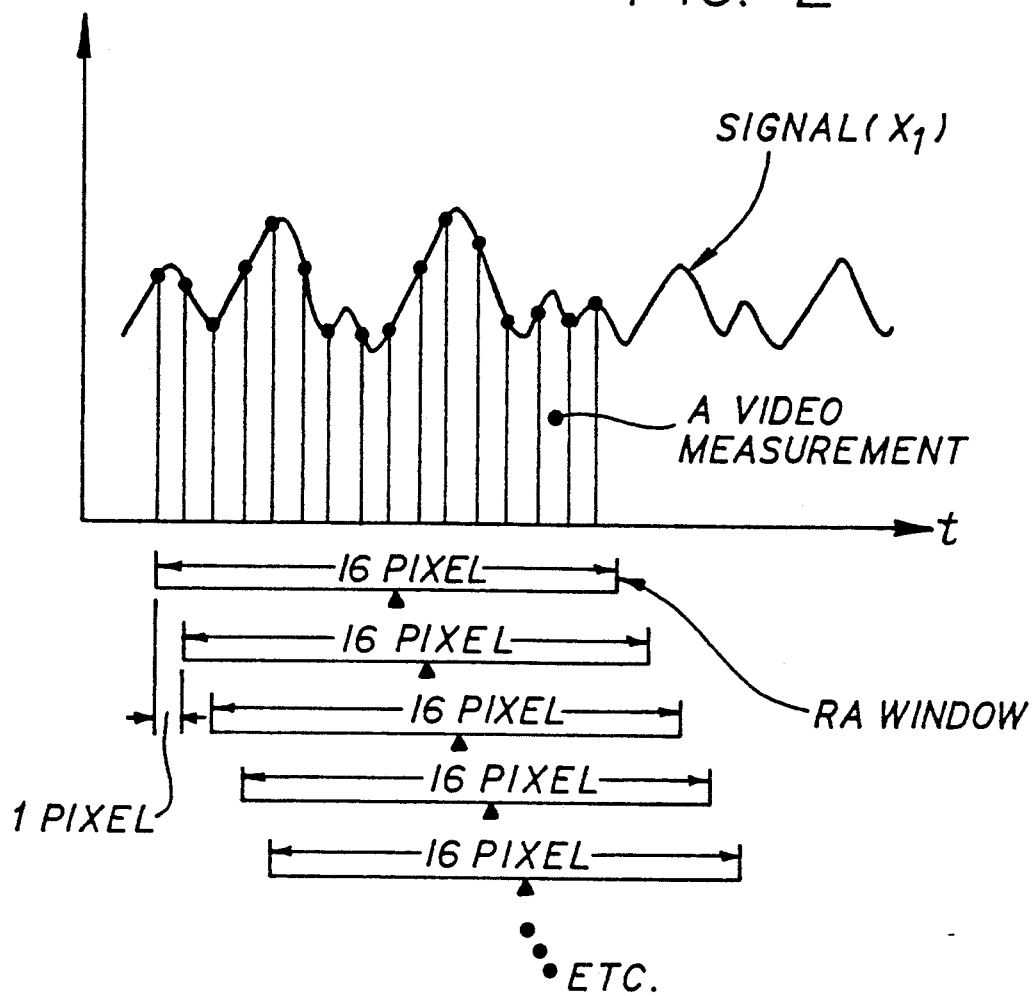
FIG. 2 is a block diagram illustrating the flow of signal information in the segmentation process of the present invention.

A sample of one-dimensional non-recursive average processing across an image is shown in FIG. 2. The process may be performed for each of the four directions. In the example shown, the running average window is sixteen pixels wide. The triangular symbol represents the particular pixel for which the running average is being calculated. The video measurement signal represents analog intensity values for pixels in the order in which they are received. In the case of a raster scan received signal, it will probably be necessary to store the analog values or digitize and store the digital values to perform computations in a direction different from the direction in which the data is naturally received.

Calculating the running average in the horizontal directions requires addressing pixel locations with positive or negative column indexing. Calculating the running average in the horizontal directions requires addressing pixel locations with positive or negative column indexing. Calculating the running average in the vertical direction requires addressing pixel locations with positive or negative row indexing. In general, the directional running averages can be represented with the following computations:

$$RA_{l-r}(x,y) = \frac{1}{L} \sum_{i=a}^{b} P(i,y) \quad (4)$$
left to right formation $$RA_{r-l}(x,y) = \frac{1}{L} \sum_{i=b}^{a} P(i,y) \quad (5)$$
right to left formation $$RA_{t-b}(x,y) = \frac{1}{L} \sum_{j=c}^{d} P(x,j) \quad (6)$$
top to bottom formation $$RA_{b-t}(x,y) = \frac{1}{L} \sum_{j=d}^{c} P(x,j) \quad (7)$$
bottom to top formation $$a = x - L/2$$
$$b = x + L/2 - 1$$
$$c = y - L/2$$
$$d = y + L/1 - 1$$

where:
a and b are the left and right positional constraints of a horizontal running average about a pixel located at (x,y), c and d are the top and bottom positional constraints of a vertical running average about a pixel located at (x,y), and L is the length of the running average.

The center position of the pixel in the average in which the average is formed about should be the same in each direction in which the running average is processed. This is important to ensure the effectiveness of the logical 'AND', operation after binarization. If the center is not consistent in each running average processing direction, the segmentation of a pixel is less likely to be consistent for each directional running average.

The running average window, using the above formulae, is sufficient for either an odd or even numbered running average window. For odd sized windows, the average is somewhat advanced, to the extent of about one half of a pixel, to the right regardless of the direction in which the directional average is taken. For even sized windows, the average is advanced to the right a whole pixel. The fact that the direction of advancement of the directional average does not change based upon the direction of the running average does not make the running average for left to right equivalent to the running average from right to left for comparison with the pixel's intensity. This is due to the possibility that the pixel on either side of the pixel being considered may have exceeded its threshold, causing threshold clamping, and comparison of the intensity of the pixel being considered with another threshold level.

Once the noise figure has been calculated according to equations (1), (2), and (3), and the running averages have been computed using equations (4), (5), (6), and (7) to establish an individual pixel threshold, the equations must be combined to generate a threshold. The following equations form a test for each pixel for each processing direction:

leading edge detection in left to right formation (8)
$$RA_{l-r}(x,y) = RA_{l-r}(x-1,y) \text{ if}$$
$$P(x + L/2 - 1,y) > RA_{l-r}(x-1,y) + \sigma_n * C_{noise}$$

leading edge detection in right to left formation (9)
$$RA_{r-l}(x,y) = RA_{r-l}(x+1,y) \text{ if}$$
$$P(x - L/2,y) > RA_{l-r}(x+1,y) + \sigma_n * C_{noise}$$

leading edge detection in top to bottom formation (10)
$$RA_{t-b}(x,y) = RA_{t-b}(x,y-1) \text{ if}$$
$$P(x,y + L/2 - 1) > RA_{t-b}(x,y-1) + \sigma_n * C_{noise}$$

leading edge detection in bottom to top formation (11)
$$RA_{b-t}(x,y) = RA_{b-t}(x,y+1) \text{ if}$$
$$P(x,y - L/2) > RA_{b-t}(x,y+1) + \sigma_n * C_{noise}$$

where $\sigma_n$ is the measured noise, and $C_{noise}$ is a noise multiplier. The noise multiplier, $C_{noise}$, can either be a constant or variable to yield a constant number of false alarms. The re-initialization of the directional running averages after a trailing edge with respect to the pertinent process direction is not done simply by re-invoking the running average equations (4), (5), (6), and (7), but by a special set of intermediate equations, known as trailing edge initialization equations, as follows:

$$RA_{l-r}(x,y) = \frac{1}{L} \left| \sum_{i=a_p+1}^{b_p} P(i,y) + P(x + L/2 - 1,y) \right| \quad (12)$$
left to right -continued $$RA_{r-l}(x,y) = \frac{1}{L} \left| \sum_{i=b_p-1}^{a_p} P(i,y) + P(x - L/2, y) \right| \quad (13)$$

right to left $$RA_{t-b}(x,y) = \frac{1}{L} \left| \sum_{i=c_p+1}^{d_p} P(x,j) + P(x, y + L/2 - 1) \right| \quad (14)$$

top to bottom $$RA_{b-t}(x,y) = \frac{1}{L} \left| \sum_{i=d_p-1}^{c_p} P(x,j) + P(x, y - L/2) \right| \quad (15)$$

bottom to top

In equations (12)-(13), $a_p$ and $b_p$ are the previous positional horizontal values of a portion of the pixels which occurred just before the clamping of the running average values, such that trailing edge initiation is based largely upon the averages previous to the beginning of object detection. The right hand term within the absolute value brackets causes the averaging in of the rightmost (leftmost) value from the point at which the running averages are unclamped.

Similarly, in equations (14)-(15) $d_p$ and $c_p$ are the previous positional vertical values of a portion of the pixels which occurred just before the clamping of the running average values, such that trailing edge initiation is based largely upon the averages previous to the beginning of object detection. The right hand term within the absolute value brackets causes the averaging in of the bottommost (topmost) value from the point at which the running averages are unclamped.

The values $a_p$, $b_p$, $c_p$ and $d_p$ are fixed as soon as a leading edge is detected in a pertinent processing direction. So, upon the detection of a pixel whose intensity is less than the clamped running average threshold, an intermediate running average threshold equation is utilized for the next pixel such that the running average is made up partially of pixels which were encountered before the leading edge of the object were detected, and made up partially of pixels which are ahead of the running average. After the appropriate intermediate equation, depending upon the direction of the running average, the regular running average equations (4), (5), (6), and (7) are utilized for the next pixel.

The intermediate equations "test" the pixel following the first below threshold pixel after a series of above threshold pixels are encountered, to insure that any very large intensities at the end of such series of above threshold pixels, which would cause the intermediate threshold to be unusually high if computed by equations (4), (5), (6), and (7), do not cause a false negative reading. Logically, an object appearing against a background should have about the same background intensity on its opposite sides.

The system and process of the present invention, using the clamped threshold, generally results in the spatial discrimination of objects larger than the length of the running average. The instant system and method herein overcomes a significant limitation which would be encountered if the running average were not clamped. If the running average were not clamped, and if the target were large enough, the running average, if left uninhibited, eventually rises asymptotically to the level of the target intensity. In that case, the running average and the noise value multiplied by a constant then effectively threshold out the rest of the target until the trailing edge of the target appears at the edge of the average.

Such an unclamped method would therefore be equivalent to a high pass spatial, or gradient filter. In such case, the discrimination length reduces to the summation length needed to accumulate a value equal to the uniform target level minus the noise. The binarized result of the present system and process contains only the target edges which is the high frequency content of the target.

In the system and process of the present invention, to minimize the discrimination, or broaden the bandwidth of the segmentation process, the running average about a pixel is limited to the running average calculated for the preceding pixel in the process direction, when a target leading edge is detected. The running average resumes normal summation when the trailing edge of the target with respect to the process direction is detected. However, and as previously explained, the average is initialized with pixel intensities stored from the running average calculated just prior to leading edge detection. Edge detection is performed by comparing the threshold calculated by the running average and the last pixel intensity positioned in the sum.

Figure 3:
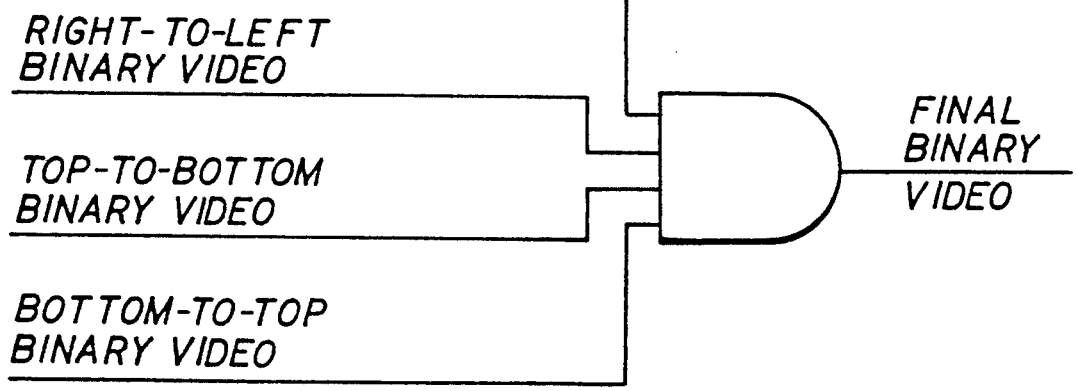
FIG. 3 is a graphical illustration of the running average for a sixteen pixel segmentation window.

The binarized results of each of the segmentation processes are combined together with a logical 'AND' operation to provide the final segmented output. This is accomplished by pixel level .AND, operations whose inputs are the threshold pixel calculations for each running average processing direction. FIG. 3 is a logic diagram having four inputs, each input representing the thresholding result for a running average taken in a direction. The binary results from each direction are "ANDed" together to form a single result for a given pixel. The "ANDing" requires that the output be positive only if all four inputs are positive. A positive logical output occurs when the pixel intensity exceeded the running average thresholds taken in all four directions. It is understood that a greater or lesser number of running averages may be taken for a given pixel, or any combination. For example, the running averages may be taken diagonally. The final binary video is shown as the output of the "AND" gate in FIG. 3.

Generally, the application of a threshold based on a non-recursive average would result in spatial discrimination of targets with unknown class. This is due to the fact that the threshold increasingly accumulates to the intensity of the object to thereby threshold out the object, allowing only those features of the object that are approximately one half the size of the non-recursive average filter length to pass through. Therefore, the segmentation system and apparatus dynamically limits each threshold once the leading edge of an object is detected in the processing direction.

The leading edge is detected by examining the intensity of the pixel spatially located at the end of a non-recursive filter. If that intensity exceeds the current threshold, then the threshold and non-recursive average is clamped to the current value. Once the trailing edge of an object is detected, the threshold is unclamped, and the non-recursive average is allowed to freely form again.

The segmented results are processing direction dependent. This is due to the fact that an edge detected in one processing direction may or may not be detected as an edge in another processing direction. Whether an edge is detected is dependent upon the sensitivity of the non-recursive average and the spatial separation of the objects within the scene. If an edge is not detected properly, clutter becomes adjoined to the object in the segmented results. By 'ANDing' the binarized results from each processing direction, clutter joined to the object in the segmentation that is not consistent in each processing direction is eliminated.

The size of the objects that can be segmented by this system and process is limited to the size of the processing window minus the regions within the processing window that are used to initialize the running averages.

Simulation has shown that the minimum filter size practically utilizable is about 8 pixels. Smaller filter lengths result in noisy segmentation because the sensitivity to spatial intensity variation is increased. Filter lengths larger than 16 pixels result in higher probability of target discrimination due to the slow response of the filter to spatial intensity changes. Also the filter length determines the area of the processing window that is lost due to the initialization of the averages. If the processing area is reduced, then the maximum target size that can be segmented within the processing window is also reduced. One half of the filter length is required to initialize the average. This is due to the fact that the running average is spatially centered about the pixel. The maximum dimension of the target that can be processed by the window is then the length of the window minus the length of the running average since the averages are initialized at both sides of the processing window.

Figure 4:
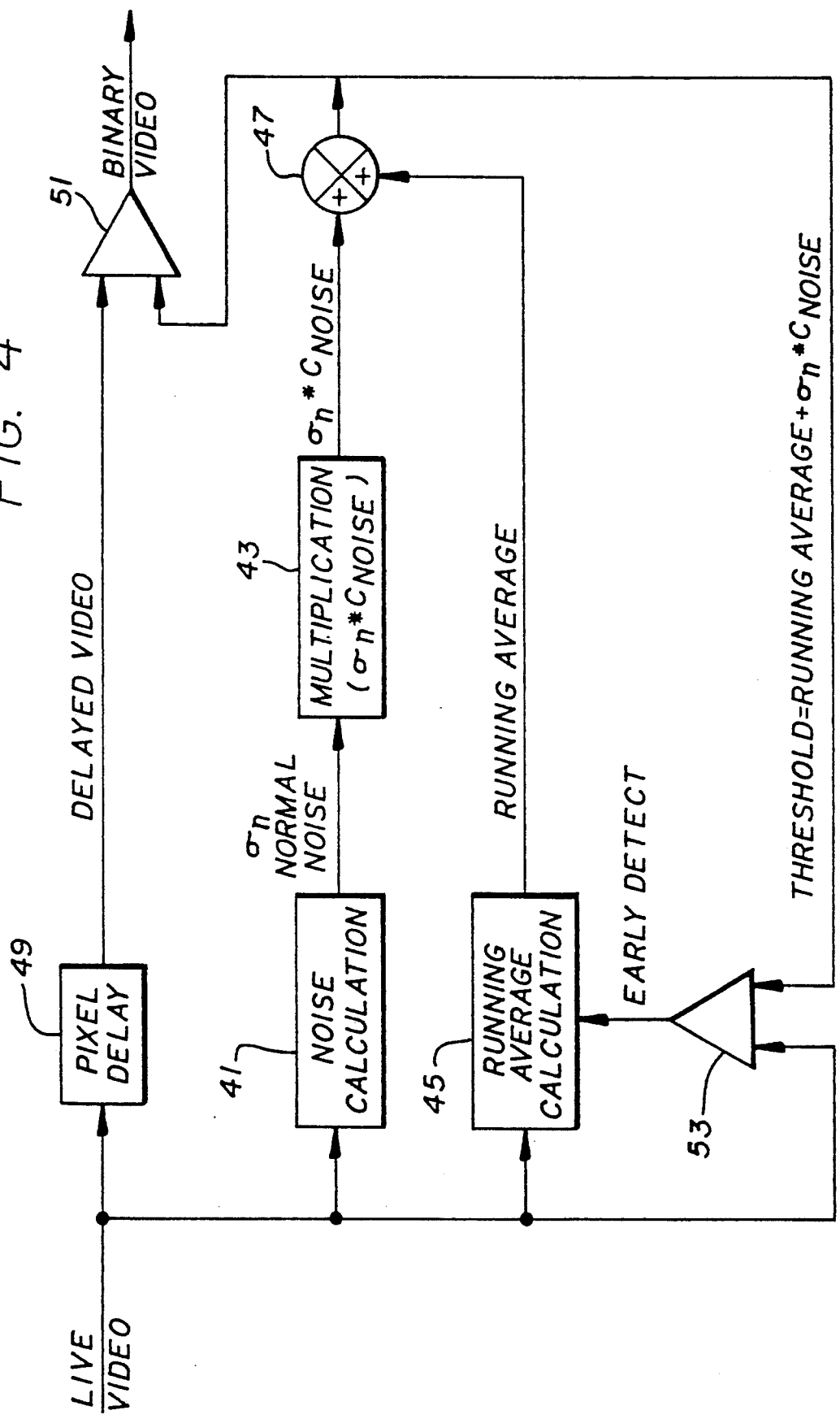
FIG. 4 is a logical representation of the ANDing function applied to the pixel characterizations based upon left to right, right to left, up to down and down to up running averages.

Referring to FIG. 4, a block diagram of one possible configuration of a system embodying the segmentation process is illustrated. A live video signal is made available to the leftmost components of FIG. 4. A noise calculation block 41 receives the live video signal and computes the absolute value of the intensity difference between each pixel and its adjacent pixels, as was previously described in equations (1), (2) and (3). It is contemplated that such calculations may be performed in an analog fashion, or in a digital fashion once digitization of the pixel intensities is accomplished.

Once the level of noise is computed, and here it is shown that the normal level $\sigma_n$ is computed in noise calculation block 41, the normal noise level is made available to a multiplication block 43. It is understood however, that the median noise $\sigma_m$ may be generated in block 41, and that the conversion to normal noise $\sigma_n$ may occur within multiplication block 43.

The live video signal is also made available and inputted into a running average calculation block 45. Running average calculation block 45 performs the processes of equations (4), (5), (6), (7), (8), (9), (10), (11) (12), (13), (14), and (15). The running average which is output is then one of either of a normal running average, a clamped running average, or an intermediate running average.

The output of running average calculation block 45 is provided to a summing junction 47. Summing junction 47 also receives a signal from multiplication block 43 representing the product of the normal noise distribution and the noise constant, or $\sigma_n^* C_{noise}$. Thus the quantity $\sigma_n^* C_{noise}$ is added to the running average signal from running average calculation block 45, to add the two quantities in accord with the right hand of equations (8)–(11).

The live video signal is also made available and inputted into a pixel delay block 49. Pixel delay block 49 delays for a finite amount of time the retransmission of each pixel through its output. The amount of delay is equivalent to the delays occurring in the sum of the noise calculation block 41, multiplication block 43 and summing junction 47. In this manner, the output of pixel delay block 49 will be in time with the output of summing junction 47. A comparator 51 has a first input connected to the output of pixel delay block 49 and a second input connected to the output of summing junction 47.

The comparator 51 assumes a logical "1" or high state whenever the intensity of the signal from pixel delay block 49 is higher than the signal from summing junction 47. When the intensity of the signal from pixel delay block 49 is lower than the signal from summing junction 47, the output of the comparator 51 assumes a logical "0" or low state.

In this manner, the output of comparator 51 is the binarized video signal, such binarization being based upon a threshold determined according to the above equations (1)–(15).

The output of summing junction 47 is also inputted into one input of a comparator 53. The live video signal is also made available and inputted into Comparator 53 via a second input. The output of comparator 53 is input into running average calculation block 45, and signals the early detection of a pixel whose intensity is greater than the current running average and $\sigma_n^* C_{noise}$ signals from summing junction 47.

Due to the delays in the system, the main comparison is made at comparator 51 a time after the threshold has been calculated and summed with the noise quantity from multiplication block 43. Thus, the detection of a pixel having an intensity above the threshold by comparator 51 will occur perhaps while the next running average either is being calculated or has been calculated. The early detect signal from comparator 53 will therefore enable early detection of a pixel whose intensity exceeds the threshold, without having to wait an amount of time for the output of comparator 51.

Note also that comparator 53 is comparing the value of a threshold which is delayed, by virtue of being processed through running average calculation block 45 and summing junction 47, with the current value of the live video signal. Thus, the early detect signal from comparator 53 provides a slightly offset, but more current indicator of the detection of a pixel having an intensity greater than threshold.

Noise measurement and segmentation using the system and process of the present invention has produced favorable results. Table I shows simulation results against 12 scenarios. The results show that without any apriori knowledge of the target size or intensity, approximately ⅔ of the target is segmented while only a small portion of background is incorrectly segmented.

TABLE I
PERFORMANCE OF DIGITAL RUNNING AVERAGE SEGMENTATION

| SCENARIO | TARGET AREA PIXELS | SEGMENTED NON-TARGET AREA (PIXELS) | SEGMENTED TARGET AREA (PIXELS) | FRACTION OF TARGET SEGMENTED | FRACTION OF NON-TARGET SEGMENTED |
|---|---|---|---|---|---|
| 1 | 106 | 0 | 88 | 83.01% | 0.00% |
| 2 | 67 | 3 | 67 | 100.00% | 4.28% |
| 3 | 12 | 0 | 3 | 25.00% | 0.00% |
| 4 | 92 | 2 | 43 | 46.74% | 4.44% |
| 5 | 167 | 12 | 87 | 52.10% | 2.12% |
| 6 | 34 | 0 | 11 | 32.35% | 0.00% |
| 7 | 3 | 0 | 2 | 66.67% | 0.00% |
| 8 | 20 | 0 | 12 | 60.00% | 0.00% |
| 9 | 7 | 0 | 5 | 71.43% | 0.00% |
| 10 | 23 | 0 | 17 | 73.91% | 0.00% |
| 11 | 71 | 21 | 58 | 81.69% | 5.58% |
| 12 | 49 | 0 | 45 | 91.83% | 0.00% |
| | | | | MEAN: 65.39% | MEAN: 3.95% |

NOISE MULTIPLIER; C NOISE = 3.75

The directional running average segmentation provides target segmentation without apriori knowledge of target size or intensity which is necessary for autonomous acquisition of targets in clutter. This invention allows the system operator to place the target in the field of view and command acquisition without entering information of target size or intensity. This drastically reduces the acquisition timeline and the operator workload.

This invention is critical to providing improved segmentation in clutter for autonomous acquisition where no apriori knowledge of the target size or intensity is available. The foregoing disclosure and description of the invention are illustrative and explanatory thereof, and various changes in the system configuration, process order, timing, number and degrees of delay, and specifications of implementation of the system and process of the present invention, and in the details of the illustrated construction may be made without departing from the spirit and scope of the invention.

We claim:

1. An image processing system where analog video signals from a detector are converted for further processing, the conversion being a function of a comparison of the analog video signal intensity level relative to a threshold, the analog video signal being associated with a matrix of pixels arranged in a plurality of rows and columns, the improvement comprising:
    means for defining an adaptive threshold level against which the analog video signal level for each pixel position is compared, said means including:
    (a) means for computing the absolute value of the intensity difference between a pixel and its adjacent pixels;
    (b) means for computing the median of the frequency distribution of said intensity differences;
    (c) means for computing a running average of the pixel intensities in at least one direction, said means for computing a running average including means for defining a window spanning a predetermined number of pixel locations in the matrix wherein the running average is the average of the intensity values of pixel locations within the window, said running average being updated as the window scans the matrix;
    (d) means for detecting if a pixel within the window exceeds a threshold level, said threshold level based upon said running average and said median; and,
    (e) means for clamping said running average as long as said pixel exceeds said threshold level.

2. The system of claim 1 wherein said threshold level is equivalent to the sum of said running average and the product of a noise constant and said median.

3. The system of claim 1 wherein said absolute value of the intensity difference between a pixel and its adjacent pixel is defined by the equation:

$$x_n = |P(i,j) - P(i + 1,j)|$$

$$i = 1 \ldots W - 1$$
$$j = 1 \ldots H$$

where:
$x_n$ represents an nth value absolute difference;
$P(i,j)$ is the pixel intensity positioned in the ith column and the jth row'
W is the processing window width; and,
H is the processing window height.

4. The system of claim 1 wherein said median of the frequency distribution of said intensity differences is defined by the equation:

$$m = \sum_{i=0}^{2^{bit}-1} n_i$$

where:
$n_1$ is the number of occurrences of an ith value nonzero absolute difference;
m is the sum of all of the differences in the histogram;
bit is the number of bits in the image intensity; and,
median is the value of $n_1$ at the point at which m attains one half of its total value.

5. The system of claim 1 wherein said running average is computed in a row is defined by the equation:

$$RA_h(x,y) = \frac{1}{L} \sum_{i=a}^{b} P(i,y)$$

where: $a = x - L/2$;
$b = x + L/2 - 1$;

a and b are the left and right positional constraints of a horizontal running average about a pixel; and,
L is the length of the running average.

6. The system of claim 1 wherein said running average is computed in a column and is defined by the equation:

$$RA_v(x,y) = \frac{1}{L} \sum_{j=c}^{d} P(x,j)$$

where: $c = y - L/2$
$d = y + L/1 - 1$ c and d are the top and bottom positional constraints of a vertical running average about a pixel; and,
L is the length of the running average.

7. The system of claim 1 wherein means for clamping said running average as long as said pixel exceeds said threshold level as defined by the equations:

$RA_{l-r}(x,y) = RA_{l-r}(x - 1,y)$ if
$P(x + (L/2) - 1,y) > RA_{l-r}(x - 1,y) + \sigma_n^* C_{noise}$ and $$RA_{l-r}(x,y) = \frac{1}{L} \left| \sum_{i=a_p+1}^{b_p} P(i,y) + P(x + (L/2) - 1,y) \right|$$

for first occurrence of
$P(x + (L/2) - 1,y) < RA_{l-r}(x - 1,y) + \sigma_n^* C_{noise}$
for left to right formations;
$RA_{r-l}(x,y) = RA_{r-l}(x + 1,y)$ if
$P(x - (L/2),y) > RA_{r-l}(x + 1,y) + \sigma_n^* C_{noise}$ and $$RA_{r-l}(x,y) = \frac{1}{L} \left| \sum_{i=b_p-1}^{a_p} P(i,y) + P(x - (L/2),y) \right|$$

for first occurrence of
$P(x - (L/2),y) < RA_{r-l}(x - 1,y) + \sigma_n^* C_{noise}$
for right to left formations; $RA_{t-b}(x,y) = RA_{t-b}(x,y - 1)$ if
$P(x,y + (L/2) - 1) > RA_{t-b}(x,y - 1) + \sigma_n^* C_{noise}$ and $$RA_{t-b}(x,y) = \frac{1}{L} \left| \sum_{i=c_p+1}^{d_p} P(x,j) + P(x,y + (L/2) - 1) \right|$$

for first occurrence of
$P(x,y + (L/2) - 1) < RA_{t-b}(x,y - 1) + \sigma_n^* C_{noise}$
for top to bottom formations; and,
$RA_{b-t}(x,y) = RA_{b-t}(x,y + 1)$ if
$P(x,y - (L/2)) > RA_{b-t}(x,y + 1) + \sigma_n^* C_{noise}$ and $$RA_{b-t}(x,y) = \frac{1}{L} \left| \sum_{i=d_p-1}^{c_p} P(x,j) + P(x,y - (L/2)) \right|$$

for first occurrence of
$P(x,y - (L/2)) < RA_{b-t}(x,y + 1) + \sigma_n^* C_{noise}$
for bottom to top formations, and where:

$a_p$ and $b_p$ are the previous positional horizontal values of a portion of the pixels which occurred just before the clamping of the running average values;
$d_p$ and $c_p$ are the previous positional vertical values of a portion of the pixels which occurred just before the clamping of the running average values;
$\sigma_n$ is the normalized measured noise;
$C_{noise}$ is the noise multiplier;
P(i,j) is the pixel intensity positioned in the ith column and the jth row; and,
L is the length of the running average.

8. The system of claim 7 where $C_{noise}$ is between from about 2.4 to about 4.8.

9. The system of claim 8 where $C_{noise}$ is about 3.8.

10. The system of claim 7 wherein the length of the window is at least 8 pixels.

11. An image processing system for analyzing analog video signals having intensities associated with various pixel positions arranged in a matrix of rows and columns, said system comprising
delay means for delaying transmission of video pixels having an input for receiving video pixels and an output for transmitting delayed video pixels;
noise calculating means for calculating the noise of said video pixels having an input for receiving video pixels and an output for transmitting a signal indicative of said calculated noise;
running average calculating means, for calculating a running average of the intensity of said video pixels having a first input for receiving video pixels, a second input for receiving a signal to hold constant said running average, and an output for transmitting a signal indicative of running average, said running average calculating means also defining a window spanning a predetermined number of pixel locations within the matrix wherein the running average is the average of the intensity values of pixel locations within the window, said running average being updated as the window scans the matrix;
summing means, having a first input connected to said output of said noise calculating means and a second input connected to said output of said running average calculating means and an output, for summing two signals and outputting the sum of the magnitudes of said signals;
first comparator means, having a first input for receiving video pixels, a second input connected to said output of said summing means, and an output connected to said second input of said running average calculation means, for detecting the presence of a pixel whose magnitude exceeds the magnitude of said output of said summing means, and
second comparator means, having a first input connected to said output of said delay means, a second input connected to said output of said summing means, and an output, for binarizing said video pixels and transmitting said binarized video pixels from said output.

12. The image processing system of claim 11 further comprising multiplication means, connected between said noise calculation means and said summing means, for multiplying the signal received from said output of said noise calculation means by a constant and transmitting said multiplied signal to said input of said summing means.

13. The system of claim 11 wherein said running average is calculated with respect to at least eight bits.

14. An image processing method for analyzing a series of analog video signals having intensities associated with various pixel positions arranged in a matrix of rows and columns, said method comprising the steps of:
delaying transmission of video pixels having an input for receiving video pixels and an output for transmitting delayed video pixels;
calculating the noise of said video pixels;
calculating a running average of the intensity of said video pixels, wherein the step of calculating a running average includes defining a window spanning a predetermined number of pixel locations within the matrix wherein the running average is the average of the intensity values of pixel locations within the window, said running average being updated as the window scans the matrix;

summing said running average and said calculated noise to form a summed output;

detecting the summed presence of a pixel whose magnitude exceeds the magnitude of said output;

clamping said running average to a constant value so long as the presence of a pixel whose magnitude exceeds said summed output is detected by comparing each successive video pixel with said summed output; and binarizing said video pixels by delaying and comparing each successive delayed video pixel with said summed output.

15. The processing method of claim 14 further comprising the step of multiplying said calculated noise by a constant before said summing step.

* * * * *